United States Patent
Kasemi et al.

(10) Patent No.: US 12,528,905 B2
(45) Date of Patent: Jan. 20, 2026

(54) AMINE-EPOXY RESIN ADDITION PRODUCT

(71) Applicant: SIKA TECHNOLOGY AG, Baar (CH)

(72) Inventors: Edis Kasemi, Zürich (CH); Oguz Sarioglu, Heilbronn (DE); Urs Burckhardt, Zürich (CH); Andreas Kramer, Zürich (CH); Ursula Stadelmann, Zürich (CH); Jochen Grötzinger, Schwäbisch Gmünd (DE); Uwe Von Der Brüggen, Meckesheim (DE)

(73) Assignee: SIKA TECHNOLOGY AG, Baar (CH)

( * ) Notice: Subject to any disclaimer, the term of this patent is extended or adjusted under 35 U.S.C. 154(b) by 557 days.

(21) Appl. No.: 17/801,905

(22) PCT Filed: Feb. 22, 2021

(86) PCT No.: PCT/EP2021/054253
§ 371 (c)(1),
(2) Date: Aug. 24, 2022

(87) PCT Pub. No.: WO2021/170512
PCT Pub. Date: Sep. 2, 2021

(65) Prior Publication Data
US 2023/0088913 A1    Mar. 23, 2023

(30) Foreign Application Priority Data
Feb. 24, 2020   (EP) ..................................... 20158937

(51) Int. Cl.
*C08G 59/18* (2006.01)
*C08G 59/24* (2006.01)
*C08G 59/50* (2006.01)

(52) U.S. Cl.
CPC ......... *C08G 59/184* (2013.01); *C08G 59/245* (2013.01); *C08G 59/5026* (2013.01); *C08G 59/5033* (2013.01)

(58) Field of Classification Search
None
See application file for complete search history.

(56) References Cited

U.S. PATENT DOCUMENTS

| 3,625,918 A | 12/1971 | Heer et al. |
| 7,598,325 B2 | 10/2009 | Ogawa et al. |
| 2020/0040215 A1 | 2/2020 | Kasemi et al. |

FOREIGN PATENT DOCUMENTS

| EP | 0 722 965 A2 | 7/1996 |
| WO | 2017/046292 A1 | 3/2017 |
| WO | 2017/046293 A1 | 3/2017 |
| WO | 2018/166996 A1 | 9/2018 |
| WO | 2019/134824 A1 | 7/2019 |

OTHER PUBLICATIONS

Aug. 30, 2022 International Preliminary Report on Patentability issued in International Patent Application No. PCT/EP2021/054253.

*Primary Examiner* — Megan McCulley
(74) *Attorney, Agent, or Firm* — Oliff PLC

(57) ABSTRACT

An amino-functional addition product from the reaction of at least one diamine of the formula (I) with at least one aromatic diepoxide in a stoichiometric ratio in the range of 1.3 to 1.7 mole diamine per 1 mole-equivalent of epoxy groups. The addition product is liquid at room temperature without a diluent and has surprisingly low viscosity. The composition allows the manufacture of low-emission epoxy-resin coatings that have good workability, cure particularly rapidly and with high surface quality in cold and damp conditions, and allow for a wide range of combinations with other amines and diluents.

10 Claims, No Drawings

AMINE-EPOXY RESIN ADDITION PRODUCT

TECHNICAL FIELD

The invention relates to amine-functional adducts of diamines with diepoxides and to the use thereof as curing agents for epoxy resin compositions that are particularly suitable as floor coatings.

STATE OF THE ART

Coatings based on epoxy resins are widely used in the building trade. They consist of liquid resin and curing agent components, which are mixed before application and then cure at ambient temperatures within a range from about 5 to 35° C. When applied, the viscosity of the coatings should be as low as possible so that they flow well at ambient temperature. After application, they should also cure as quickly as possible and without defects, even under damp and cold conditions, and form a defect-free surface without haze, spots, tack or craters. Once cured, they should have high hardness coupled with low brittleness and a high glass transition temperature in order to withstand mechanical stress as well as possible. For visually demanding applications, for example top coverings of floors, they should additionally have a high level of gloss and a minimal tendency to yellowing under the influence of light.

However, such epoxy resin coatings often have a tendency to surface defects such as haze, spots, roughness or tack, which is also referred to as "blushing". Blushing is caused by the amines present in the curing agent component forming a salt with carbon dioxide from the air and occurs particularly at high humidity and low temperatures. Many curing agents for epoxy resin coatings comprise adducts of diamines with epoxy resin. This reduces blushing effects and also permits more rapid curing. However, diamine-epoxy resin adducts are significantly more viscous than the free diamines. In order to limit the viscosity, the diamine is used in a large stoichiometric excess relative to the epoxy resin. The content of unreacted diamine and the distribution of the various adduct molecules varies according to the stoichiometry and the level of the diamine excess used in the production of the adducts. Adducts produced using a low excess of diamine contain less unreacted diamine and more higher-molecular-weight adduct molecules having two, three or more diepoxide units. Such adducts would themselves be advantageous. They have low odor, a particularly low tendency to blushing, and make it possible for the adduct to be used in large amounts and/or to be combined with further amines.

Adducts produced with a low excess of diamine are however very highly viscous or even solid, consequently it is possible to handle them at room temperature only with considerable amounts of thinners such as benzyl alcohol. Thinners are not incorporated into the resin matrix during curing and may be released into the environment through evaporation or diffusion processes. Nowadays, there is however an increasing desire for low-emission products that after curing have a low content of releasable substances. For low-emission or emission-free epoxy resin compositions, thinners of this kind can therefore be used only in small amounts or not at all.

Diluent-free adducts of diamines with aromatic epoxy resins from the prior art are typically produced in a stoichiometry of at least 2.5 moles of diamine to 1 molar equivalent of epoxy groups, for example in comparative example 2 in EP 0 722 965 or synthesis examples 1 and 3 in U.S. Pat. No. 7,598,325. Adducts produced with a smaller excess of diamine contain thinners, usually benzyl alcohol, as is the case for example in WO 2019/134824, where adducts of methylcyclohexyldiamine or isophoronediamine or meta-xylylenediamine with 1.25 moles of diamine per molar equivalent of epoxy groups were produced, to which benzyl alcohol was added in order to permit a manageable viscosity.

Example 3 of U.S. Pat. No. 3,625,918 describes an adduct of isophoronediamine with bisphenol A diglycidyl ether in a ratio of 1.2 mole of diamine to 1 molar equivalent of epoxy groups. This adduct is solid at room temperature.

WO 2017/046293 discloses adducts of N-benzylpropane-1,2-diamine and N-benzylethane-1,2-diamine with bisphenol A diglycidyl ether in a ratio of 2.5 moles of diamine to 1 molar equivalent of epoxy groups (adduct 1 or adduct 8).

Also known are adducts of alkylated diamines with epoxides as a constituent of curing agents for aqueous epoxy resin products. Such adducts typically contain polyether units and, after the reaction, are thinned with water and often also large amounts of unadducted diamines.

Adducts of diamines with aromatic epoxy resins that are produced with a low excess of diamine and remain permanently liquid at room temperature without thinner and are easy to handle are not known from the prior art.

SUMMARY OF THE INVENTION

It is therefore an object of the present invention to provide a diamine-epoxy resin adduct produced with a low excess of diamine that without the addition of thinners remains liquid at room temperature for a relatively long time, is easy to handle, and that, when used as a curing agent for epoxy resin coatings, allows good processability, rapid curing, and defect-free, glossy surfaces, even in damp and cold conditions.

This object is achieved by the adduct as claimed in claim 1. It is produced from a diamine of formula (I), which is a monoalkylated primary diamine, and an aromatic diepoxide in a stoichiometric ratio within a range from 1.3 to 1.7 moles of diamine to 1 molar equivalent of epoxy groups. Surprisingly, the adduct is at room temperature liquid and of low viscosity without the addition of thinners and remains liquid and clear even after standing for relatively long periods. It accordingly does not need to be heated or thinned in order to be used as a constituent of a curing agent for epoxy resins.

It has a relatively high concentration of adduct molecules and only a low content of unreacted diamine of formula (I). As a result, it has a particularly low odor and can be used in a variety of ways in a curing agent for epoxy resins. It permits thinner-free or low-thinner curing agents having a particularly high concentration of adduct molecules and thus more rapid curing. Moreover, it can be combined with large amounts of further amines, in particular also with non-alkylated primary diamines, which permits rapid curing and high glass transition temperatures and is particularly economical.

The adduct of the invention thins epoxy resin compositions surprisingly well, despite the high content of higher adduct molecules. It permits low-emission or emission-free epoxy resin coatings having good processability and rapid curing that also have little tendency to blushing-related defects even under damp and cold conditions and that, after curing, have high hardness and low tendency to yellowing.

Further aspects of the invention are the subject of further independent claims. Particularly preferred embodiments of the invention are the subject of the dependent claims.

WAYS OF EXECUTING THE INVENTION

The invention provides an amine-functional adduct from the reaction of
(i) at least one diamine of formula (I)

where
A is an alkylene radical, cycloalkylene radical or arylalkylene radical having 2 to 12 carbon atoms, and
R is an alkyl radical, cycloalkyl radical or arylalkyl radical having 1 to 12 carbon atoms,
wherein the two nitrogen atoms are separated from one another by at least two carbon atoms and the diamine of formula (I) has a total of 8 to 15 carbon atoms,
with
(ii) at least one aromatic diepoxide
in a stoichiometric ratio within a range from 1.3 to 1.7 moles of diamine to 1 molar equivalent of epoxy groups.

A diepoxide is referred to as "aromatic" if it contains at least one aromatic ring.

A "primary amino group" refers to an amino group that is attached to a single organic radical and bears two hydrogen atoms; a "secondary amino group" refers to an amino group that is attached to two organic radicals that may also together be part of a ring and bears one hydrogen atom; and a "tertiary amino group" refers to an amino group that is attached to three organic radicals, two or three of which may also be part of one or more rings, and does not bear any hydrogen atom.

"Amine hydrogen" refers to the hydrogen atoms of primary and secondary amino groups.

"Amine hydrogen equivalent weight" refers to the mass of an amine or an amine-containing composition that contains one molar equivalent of amine hydrogen. It is expressed in units of "g/equiv.".

The "epoxide equivalent weight" refers to the mass of an epoxy group-containing compound or composition that contains one molar equivalent of epoxy groups. It is expressed in units of "g/equiv.".

Substance names beginning with "poly", such as polyamine or polyepoxide, refer to substances that formally contain two or more of the functional groups that occur in their name per molecule.

A "thinner" refers to a substance that is soluble in an epoxy resin and lowers its viscosity, and that is not chemically incorporated into the epoxy resin polymer during the curing process.

"Molecular weight" refers to the molar mass (in grams per mole) of a molecule.

"Average molecular weight" refers to the number-average molecular weight $M_n$ of a polydisperse mixture of oligomeric or polymeric molecules, which is typically determined by gel-permeation chromatography (GPC) against polystyrene as standard.

The "gel time" is the time interval from mixing the components of an epoxy resin composition until the gelation thereof.

"Room temperature" refers to a temperature of 23° C.

A is preferably selected from the group consisting of 1,2-ethylene, 1,2-propylene, 1,3-propylene, 1,4-butylene, 1,3-butylene, 2-methyl-1,2-propylene, 1,3-pentylene, 1,5-pentylene, 2,2-dimethyl-1,3-propylene, 1,6-hexylene, 2-methyl-1,5-pentylene, 1,7-heptylene, 1,8-octylene, 2,5-dimethyl-1,6-hexylene, 1,9-nonylene, 2,2(4),4-trimethyl-1,6-hexylene, 1,10-decylene, 1,11-undecylene, 2-butyl-2-ethyl-1,5-pentylene, 1,12-dodecylene, 1,2-cyclohexylene, 1,3-cyclohexylene, 1,4-cyclohexylene, (1,5,5-trimethylcyclohexan-1-yl)methane-1,3, 4(2)-methyl-1,3-cyclohexylene, 1,3-cyclohexylenebis(methylene), 1,4-cyclohexylenebis(methylene), 1,3-phenylenebis(methylene), and 1,4-phenylenebis(methylene). These diamines of formula (I) are derived from commercially readily available primary diamines.

A is especially selected from the group consisting of 1,2-ethylene, 1,2-propylene, 2-methyl-1,2-propylene, 1,3-pentylene, 1,2-cyclohexylene, 1,4-cyclohexylene, 4(2)-methyl-1,3-cyclohexylene, 1,3-cyclohexylenebis(methylene), 1,4-cyclohexylenebis(methylene), 1,3-phenylenebis(methylene), and 1,4-phenylenebis(methylene).

A is most preferably 1,2-ethylene. These diamines of formula (I) permit adducts having particularly low viscosity and particularly high reactivity and permit a particularly low tendency to yellowing.

R is preferably selected from the group consisting of methyl, ethyl, propyl, isopropyl, n-butyl, isobutyl, sec-butyl, n-pentyl, 3-methylbut-2-yl, hexyl, 4-methylpent-2-yl, 2-ethylhexyl, octyl, nonyl, decyl, undecyl, dodecyl, and an optionally substituted 1-phenylethyl, 2-phenylethyl, benzyl, naphthylmethyl, cyclohexylmethyl, and 2-cyclohexylethyl radical.

Preference is given to radicals R having 6 to 12 carbon atoms, especially 6 to 8 carbon atoms.

R is particularly preferably selected from the group consisting of 2-ethylhexyl, 2-phenylethyl, benzyl, 1-naphthylmethyl, and cyclohexylmethyl.

Most preferably, R is benzyl. These diamines of formula (I) permit adducts having particularly low viscosity, particularly high reactivity, particularly little tendency to blushing effects, and low tendency to yellowing, especially when combined with radicals A that are free from aromatic groups.

The diamine of formula (I) is particularly preferably selected from the group consisting of N-benzylethane-1,2-diamine, N-(1-naphthylmethyl)ethane-1,2-diamine, N-cyclohexylmethylethane-1,2-diamine, N-benzylpropane-1,2-diamine, and N-(2-ethylhexyl)-1,3-bis(aminomethyl)benzene.

The most preferred diamine of formula (I) is N-benzylethane-1,2-diamine. This diamine permits particularly low-viscosity and reactive adducts.

The diamine of formula (I) is preferably produced by partial alkylation of at least one amine of formula $H_2N$-A-$NH_2$ with at least one alkylating agent.

The alkylation is preferably a reductive alkylation using an aldehyde or ketone as the alkylating agent and hydrogen.

Preference is given to carrying out the reductive alkylation in the presence of a suitable catalyst. Preferred catalysts are palladium on charcoal (Pd/C), platinum on charcoal (Pt/C), Adams' catalyst or Raney nickel, especially palladium on charcoal or Raney nickel.

When molecular hydrogen is used, the reductive alkylation is preferably operated in a pressure apparatus at a hydrogen pressure of 5 to 150 bar, especially 10 to 100 bar. This can take place in a batchwise process or preferably in a continuous process.

The reductive alkylation is preferably carried out at a temperature within a range from 40 to 120° C., in particular 60 to 100° C.

In the case of small volatile amines such as ethane-1,2-diamine or propane-1,2-diamine in particular, this is preferably used in a stoichiometric excess relative to the aldehyde or ketone and, after the alkylation, some or all of the unreacted amine is removed from the reaction mixture, especially by stripping. If desired, the reaction mixture may then be purified further, especially by removing by distillation some or all of the dialkylated amine from the diamine of formula (I) that is obtained.

The diamine of formula (I) used for producing the adduct preferably has a purity of at least 80% by weight. This affords adducts of high reactivity. The purity is preferably at least 85% by weight, more preferably at least 90% by weight, in particular at least 95% by weight.

The aromatic diepoxide is preferably selected from the group consisting of bisphenol A diglycidyl ether, bisphenol F diglycidyl ether, mixtures of bisphenol A diglycidyl ether and bisphenol F diglycidyl ether, catechol diglycidyl ether, resorcinol diglycidyl ether, hydroquinone diglycidyl ether, bis(4-hydroxy-3-methylphenyl)methane diglycidyl ether, 2,2-bis(4-hydroxy-3-methylphenyl)propane diglycidyl ether, bis(3,5-dimethyl-4-hydroxyphenyl)methane diglycidyl ether, 2,2-bis(3,5-dimethyl-4-hydroxyphenyl)propane diglycidyl ether, 2,2-bis(4-hydroxy-3-tert-butylphenyl)propane diglycidyl ether, 2,2-bis(4-hydroxyphenyl)butane diglycidyl ether, 3,3-bis(4-hydroxyphenyl)pentane diglycidyl ether, 3,4-bis(4-hydroxyphenyl)hexane diglycidyl ether, 4,4-bis(4-hydroxyphenyl)heptane diglycidyl ether, 2,4-bis(4-hydroxyphenyl)-2-methylbutane diglycidyl ether, and 4,4'-dihydroxybiphenyl diglycidyl ether.

The aromatic diepoxide is particularly preferably a bisphenol A diglycidyl ether, bisphenol F diglycidyl ether or bisphenol A/F diglycidyl ether, especially a bisphenol A diglycidyl ether.

The aromatic diepoxide is preferably used in a technical grade quality.

Particular preference is given to commercially available liquid resins, such as in particular Araldite® GY 240, Araldite® GY 250, Araldite® GY 281, Araldite® GY 282, Araldite® GY 285, Araldite® PY 304 or Araldite® PY 720 (all from Huntsman), or D.E.R.® 330, D.E.R.® 331, D.E.R.® 332, D.E.R.® 336, D.E.R.® 351, D.E.R.® 352, D.E.R.® 354 or D.E.R.® 356 (all from Dow).

The aromatic diepoxide preferably has an epoxide equivalent weight within a range from 110 to 260 g/equiv., preferably 156 to 200 g/equiv.

The diamine of formula (I) is used in the production of the adduct in a stoichiometric ratio within a range from 1.3 to 1.7 moles of diamine to 1 molar equivalent of epoxy groups.

The stoichiometric ratio is preferably within a range from 1.4 to 1.6 moles of diamine to 1 molar equivalent of epoxy groups.

Preferably, the temperature during the reaction is within a range from 40 to 120° C., especially 60 to 100° C.

After the reaction, unreacted diamine of formula (I) is preferably not removed from the reaction product but remains therein and is a constituent of the adduct.

The adduct contains so-called 2:1 adducts from the addition of 2 moles of diamine of formula (I) and 1 mole of diepoxide. In the case of N-benzylethane-1,2-diamine and bisphenol A diglycidyl ether, the adduct contains predominantly the following 2:1 adducts, in decreasing amounts:

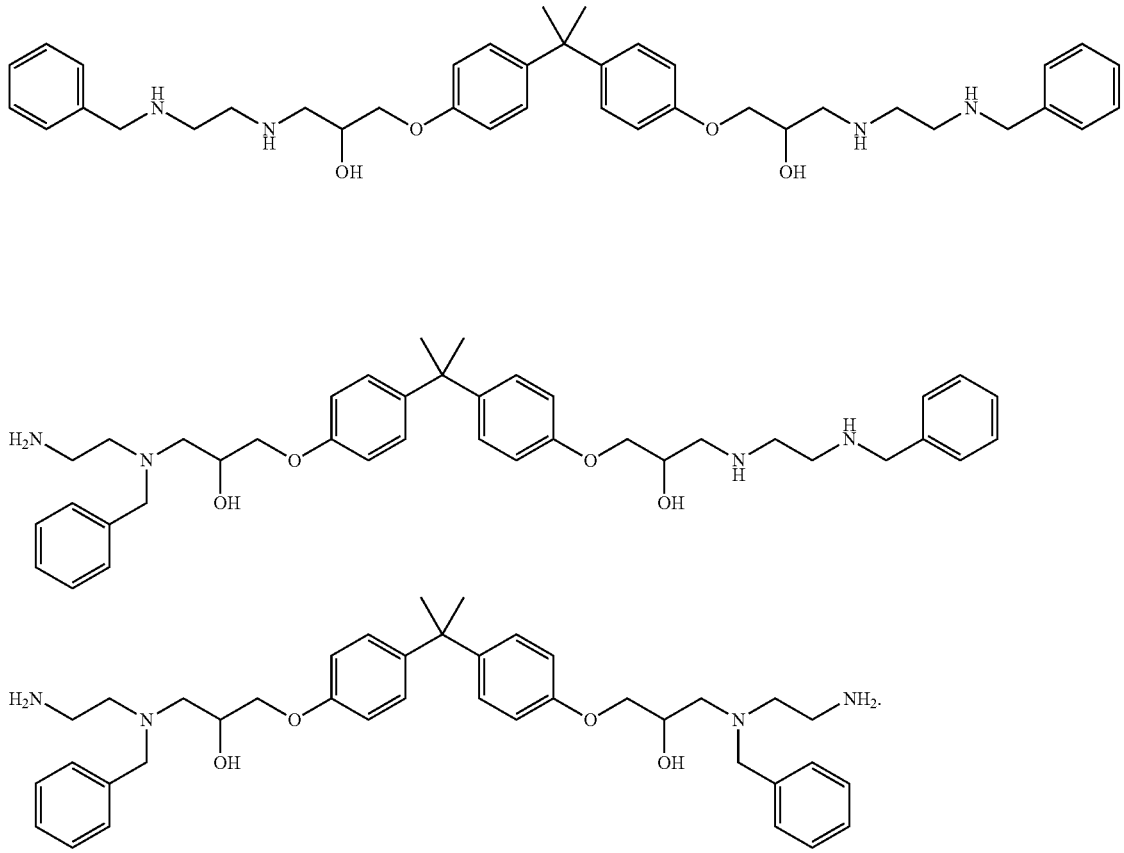

The adduct also contains higher adducts, in particular so-called 3:2 adducts from the addition of 3 moles of diamine of formula (I) and 2 moles of diepoxide; in the case of N-benzylethane-1,2-diamine and bisphenol A diglycidyl ether, it is mainly the following:

Suitable further amines are especially N-benzylethane-1, 2-diamine, N-benzylpropane-1,2-diamine, N-benzyl-1,3-bis (aminomethyl)benzene, N-(2-ethylhexyl)-1,3-bis(aminomethyl)benzene or N-(2-phenylethyl)-1,3-bis(aminomethyl) benzene, and also 2,2-dimethylpropane-1,3-diamine,

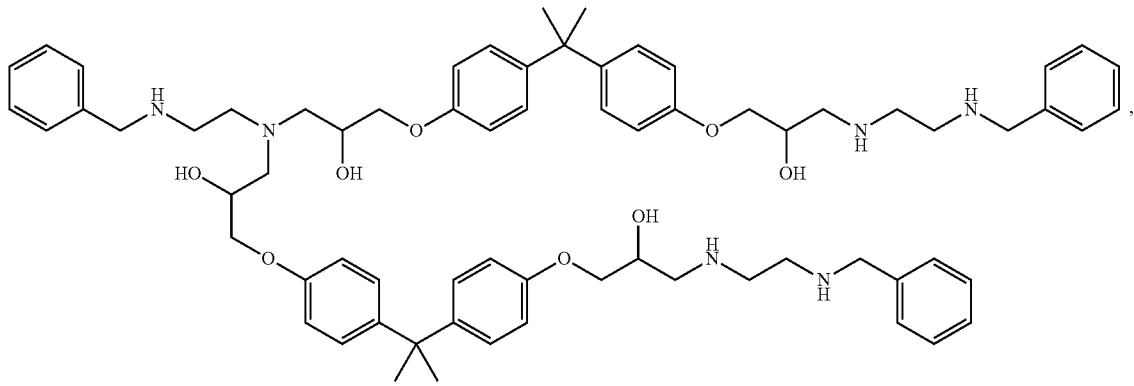 [SMILES: CC(C)(c1ccc(OCC(O)CNCCNCc2ccccc2)cc1)c1ccc(OCC(O)CN(CCNCc2ccccc2)CC(O)COc2ccc(C(C)(C)c3ccc(OCC(O)CNCCNCc4ccccc4)cc3)cc2)cc1]

that is present, alongside 3:2 adducts from reaction with secondary amino groups.

The adduct also contains further higher adducts, so-called >3:2 adducts, in particular those from the addition of 4 moles of diamine of formula (I) and 3 moles of diepoxide or 5 moles of diamine of formula (I) and 4 moles of diepoxide.

The adduct of the invention preferably contains 2:1 adducts and higher adducts in a weight ratio within a range from 30/70 to 49.9/50.1, in particular 35/65 to 49/51. Such an adduct permits an advantageous combination of low viscosity and rapid curing.

The adduct of the invention surprisingly remains at room temperature permanently liquid and easy to handle, even when it is essentially free of thinners or water.

The adduct preferably contains less than 1% by weight of thinner or water.

The adduct preferably has a viscosity at 20° C. within a range from 50 to 500 Pa·s, in particular 100 to 400 Pa·s, measured using a cone-plate viscometer at a shear rate of $10 \text{ s}^{-1}$.

The adduct of the invention is particularly suitable for curing an epoxy resin.

The invention further provides a curing agent for epoxy resins, comprising the adduct of the invention and at least one further constituent selected from the group consisting of further amines, accelerators, and thinners.

The curing agent preferably contains 1% to 70% by weight, preferably 2% to 60% by weight, more preferably 3% to 50% by weight, in particular 4% to 40% by weight, most preferably 5% to 30% by weight, of the adduct of the invention.

The curing agent is preferably not water-based. It especially contains less than 15% by weight, preferably less than 10% by weight, of water. Such a curing agent is suitable for nonaqueous epoxy resin products, especially floor coatings.

The curing agent preferably comprises at least one further amine having aliphatic amino groups and at least three amine hydrogens. This further amine was not present during production of the adduct, but is mixed with the adduct only afterwards. This further amine may be the same amine as the one used to produce the adduct as the diamine of formula (I), or it may be a different amine.

pentane-1,3-diamine (DAMP), pentane-1,5-diamine, 1,5-diamino-2-methylpentane (MPMD), 2-butyl-2-ethylpentane-1,5-diamine (C11-neodiamine), hexane-1,6-diamine, 2,5-dimethylhexane-1,6-diamine, 2,2(4),4-trimethylhexane-1,6-diamine (TMD), heptane-1,7-diamine, octane-1,8-diamine, nonane-1,9-diamine, decane-1,10-diamine, undecane-1,11-diamine, dodecane-1,12-diamine, 1,2-, 1,3- or 1,4-diaminocyclohexane, 1,3-bis(aminomethyl)cyclohexane, 1,4-bis (aminomethyl)cyclohexane, bis(4-aminocyclohexyl) methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 1-amino-3-aminomethyl-3,5,5-trimethylcyclohexane (IPDA), 2(4)-methyl-1,3-diaminocyclohexane, 2,5(2,6)-bis(aminomethyl)bicyclo [2.2.1]heptane (NBDA), 3(4),8(9)-bis(aminomethyl)tricyclo [5.2.1.0$^{2.6}$]decane, 1,4-diamino-2,2,6-trimethylcyclohexane (TMCDA), menthane-1,8-diamine, 3,9-bis(3-aminopropyl)-2,4,8,10-tetraoxaspiro[5.5]undecane, 1,3-bis(aminomethyl) benzene (MXDA), 1,4-bis(aminomethyl)benzene, bis(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine or higher oligomers of these diamines, bis(3-aminopropyl)polytetrahydrofurans or other polytetrahydrofurandiamines, polyoxyalkylenediamines or -triamines, especially polyoxypropylenediamines or polyoxypropylenetriamines such as Jeffamine® D-230, Jeffamine® D-400 or Jeffamine® T-403 (all from Huntsman), diethylene triamine (DETA), triethylene tetramine (TETA), tetraethylene pentamine (TEPA), pentaethylene hexamine (PEHA), dipropylene triamine (DPTA), N-(2-aminoethyl)propane-1,3-diamine (N3-amine), N,N'-bis(3-aminopropyl)ethylenediamine (N4-amine), N,N'-bis(3-aminopropyl)-1,4-diaminobutane, N5-(3-aminopropyl)-2-methylpentane-1,5-diamine, N3-(3-aminopentyl)pentane-1,3-diamine, N5-(3-amino-1-ethylpropyl)-2-methylpentane-1,5-diamine, N,N'-bis(3-amino-1-ethylpropyl)-2-methylpentane-1,5-diamine, 3-(2-aminoethyl)aminopropylamine, bis(hexamethylene) triamine (BHMT), N-aminoethylpiperazine, 3-dimethylaminopropylamine (DMAPA) or 3-(3-(dimethylamino)propylamino)propylamine (DMAPAPA).

It may be advantageous when the curing agent of the invention comprises a combination of two or more further amines.

Preference is given to further amines selected from the group consisting of N-benzylethane-1,2-diamine, N-benzylpropane-1,2-diamine, N-benzyl-1,3-bis(aminomethyl)benzene, N-(2-ethylhexyl)-1,3-bis(aminomethyl)benzene, N-(2-phenylethyl)-1,3-bis(aminomethyl)benzene, TMD, 1,2-diaminocyclohexane, 1,3-diaminocyclohexane, 1,4-diaminocyclohexane, 1,3-bis(aminomethyl)cyclohexane, 1,4-bis(aminomethyl)cyclohexane, bis(4-aminocyclohexyl) methane, IPDA, 2(4)-methyl-1,3-diaminocyclohexane, MXDA, polyoxypropylenediamines having an average molecular weight $M_n$ within a range from 200 to 500 g/mol, polyoxypropylene triamines having an average molecular weight $M_n$ within a range from 300 to 500 g/mol, DMAPAPA, BHMT, DETA, TETA, TEPA, PEHA, DPTA, N3-amine and N4-amine.

Preference among these is given to N-benzylethane-1,2-diamine, TMD, 1,2-diaminocyclohexane, 1,3-bis(aminomethyl)cyclohexane, 1,4-bis(aminomethyl)cyclohexane, IPDA, 2(4)-methyl-1,3-diaminocyclohexane, MXDA, polyoxypropylene diamines or polyoxypropylene triamines.

A particularly preferred further amine is N-benzylethane-1,2-diamine. This amine permits curing agents having particularly good processability, rapid curing and little tendency to blushing effects.

Another particularly preferred further amine is MXDA, optionally in the form of an amine-functional adduct with an epoxy resin. This amine permits particularly rapid curing.

Another particularly preferred further amine is IPDA, optionally in the form of an amine-functional adduct with an epoxy resin. This amine permits a particularly high glass transition temperature and final hardness.

Preferably, IPDA and/or an adduct of IPDA with an epoxy resin is present in the curing agent in such an amount that the ratio of the number of amine hydrogens derived from IPDA and from the diamine of formula (I) is within a range from 90/10 to 20/80, more preferably 85/15 to 25/75, in particular 80/20 to 30/70. The amine hydrogens of free IPDA, adducted IPDA, free diamine of formula (I), and adducted diamine of formula (I) are counted too here. Such a curing agent permits a particularly attractive combination of rapid curing, high final hardness, high glass transition temperature, and little tendency to blushing effects.

Suitable accelerators are especially acids or compounds hydrolyzable to acids, especially organic carboxylic acids such as acetic acid, benzoic acid, salicylic acid, 2-nitrobenzoic acid, lactic acid, organic sulfonic acids such as methanesulfonic acid, p-toluenesulfonic acid or 4-dodecylbenzenesulfonic acid, sulfonic esters, other organic or inorganic acids, such as phosphoric acid in particular, or mixtures of the abovementioned acids and acid esters, nitrates such as calcium nitrate in particular; tertiary amines such as in particular 1,4-diazabicyclo[2.2.2]octane, benzyldimethylamine, α-methylbenzyldimethylamine, triethanolamine, dimethylaminopropylamine, imidazoles such as in particular N-methylimidazole, N-vinylimidazole or 1,2-dimethylimidazole, salts of such tertiary amines, quaternary ammonium salts, such as benzyltrimethylammonium chloride in particular, amidines, such as 1,8-diazabicyclo[5.4.0]undec-7-ene in particular, guanidines, such as 1,1,3,3-tetramethylguanidine in particular, phenols, especially bisphenols, phenolic resins or Mannich bases such as in particular 2-(dimethylaminomethyl)phenol, 2,4,6-tris(dimethylaminomethyl)phenol or polymers produced from phenol, formaldehyde and N,N-dimethylpropane-1,3-diamine, phosphites such as in particular di- or triphenyl phosphites, or compounds having mercapto groups.

Preference is given to acids, nitrates, tertiary amines or Mannich bases, especially salicylic acid, calcium nitrate or 2,4,6-tris(dimethylaminomethyl)phenol, or a combination of these accelerators.

Suitable thinners are especially xylene, 2-methoxyethanol, dimethoxyethanol, 2-ethoxyethanol, 2-propoxyethanol, 2-isopropoxyethanol, 2-butoxyethanol, 2-phenoxyethanol, 2-benzyloxyethanol, benzyl alcohol, ethylene glycol, ethylene glycol dimethyl ether, ethylene glycol diethyl ether, ethylene glycol dibutyl ether, ethylene glycol diphenyl ether, diethylene glycol, diethylene glycol monomethyl ether, diethylene glycol monoethyl ether, diethylene glycol mono-n-butyl ether, diethylene glycol dimethyl ether, diethylene glycol diethyl ether, diethylene glycol di-n-butyl ether, propylene glycol butyl ether, propylene glycol phenyl ether, dipropylene glycol, dipropylene glycol monomethyl ether, dipropylene glycol dimethyl ether, dipropylene glycol di-n-butyl ether, diphenylmethane, diisopropyinaphthalene, mineral oil fractions, for example Solvesso® grades (from Exxon), alkylphenols such as tert-butylphenol, nonylphenol, dodecylphenol, cardanol (from cashew nut shell oil, containing 3-(8,11-pentadecadienyl)phenol as its principal constituent), styrenized phenol, bisphenols, aromatic hydrocarbon resins, especially types containing phenol groups, alkoxylated phenol, especially ethoxylated or propoxylated phenol, especially 2-phenoxyethanol, adipates, sebacates, phthalates, benzoates, organic phosphoric or sulfonic esters or sulfonamides.

Preferred thinners have a boiling point of more than 200° C.

The thinner is preferably selected from the group consisting of benzyl alcohol, styrenized phenol, ethoxylated phenol, aromatic hydrocarbon resins containing phenol groups, especially the Novares® LS 500, LX 200, LA 300 or LA 700 products (from Rütgers), diisopropylnaphthalene and cardanol.

Particular preference is given to benzyl alcohol.

Thinners containing phenol groups are also effective as accelerator.

The curing agent may contain further constituents, especially the following:
 further adducts, especially adducts of MXDA, DETA, TETA or TEPA with bisphenol A, F or A/F diglycidyl ethers, or adducts of MPMD or ethane-1,2-diamine or propane-1,2-diamine with cresyl glycidyl ether, in which unreacted MPMD or ethane-1,2-diamine or propane-1,2-diamine were removed by distillation after the reaction;
 diamines having two secondary amino groups, in particular those derived from diamines of formula (I) that are alkylated on both nitrogen atoms, especially N,N'-dibenzylethane-1,2-diamine, or other diamines having two secondary amino groups;
 monoamines such as in particular benzylamine or furfurylamine;
 polyamidoamines, especially reaction products of a mono- or polybasic carboxylic acid, or the ester or anhydride thereof, especially a dimer fatty acid, with a polyamine used in stoichiometric excess, especially DETA or TETA;
 Mannich bases, especially phenalkamines, i.e. reaction products of phenols, especially cardanol, with aldehydes, especially formaldehyde, and polyamines.

aromatic polyamines such as in particular 4,4'-, 2,4' and/or 2,2'-diaminodiphenylmethane, 2,4- and/or 2,6-tolylenediamine, 3,5-dimethylthio-2,4-tolylenediamine and/or 3,5-dimethylthio-2,6-tolylenediamine, 3,5-diethyl-2,4-tolylenediamine and/or 3,5-diethyl-2,6-tolylenediamine;

compounds having mercapto groups, especially liquid mercaptan-terminated polysulfide polymers, mercaptan-terminated polyoxyalkylene ethers, mercaptan-terminated polyoxyalkylene derivatives, polyesters of thiocarboxylic acids, 2,4,6-trimercapto-1,3,5-triazine, triethylene glycol dimercaptan or ethanedithiol.

In addition to the adduct of the invention, optionally further diamine of formula (I) and optionally IPDA, the curing agent preferably has only a low content of further amines.

It is preferable that at least 30%, more preferably at least 40%, in particular at least 50%, of all the amine hydrogens present in the curing agent derive from diamine of formula (I) and IPDA. The amine hydrogens of adducted diamine of formula (I), adducted IPDA, free diamine of formula (I) and free IPDA are counted too here. Such a curing agent permits an attractive combination of rapid curing, little tendency to blushing effects, high hardness, and high glass transition temperature.

The curing agent preferably has only a low amount of thinners, more particularly 0% to 50% by weight, preferably 0% to 30% by weight, of thinners, especially benzyl alcohol.

The present invention further provides an epoxy resin composition comprising
a resin component comprising at least one epoxy resin and
a curing agent component comprising the adduct of the invention.

The curing agent component preferably comprises the curing agent described above.

A suitable epoxy resin is obtained in a known manner especially from the reaction of epichlorohydrin with polyols, polyphenols or amines.

Suitable epoxy resins are especially aromatic epoxy resins, especially the glycidyl ethers of:

bisphenol A, bisphenol F or bisphenol A/F, where A stands for acetone and F for formaldehyde used as reactants in the production of these bisphenols. In the case of bisphenol F, positional isomers may also be present, more particularly ones derived from 2,4'- or 2,2'-hydroxyphenylmethane.

dihydroxybenzene derivatives such as resorcinol, hydroquinone or catechol;

further bisphenols or polyphenols such as bis(4-hydroxy-3-methylphenyl)methane, 2,2-bis(4-hydroxy-3-methylphenyl)propane (bisphenol C), bis(3,5-dimethyl-4-hydroxyphenyl)methane, 2,2-bis(3,5-dimethyl-4-hydroxyphenyl)propane, 2,2-bis(3,5-dibromo-4-hydroxyphenyl)propane, 2,2-bis(4-hydroxy-3-tert-butylphenyl)propane, 2,2-bis(4-hydroxyphenyl)butane (bisphenol B), 3,3-bis(4-hydroxyphenyl)pentane, 3,4-bis(4-hydroxyphenyl)hexane, 4,4-bis(4-hydroxyphenyl)heptane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane (bisphenol Z), 1,1-bis(4-hydroxyphenyl)-3,3,5-timethylcyclohexane (bisphenol TMC), 1,1-bis(4-hydroxyphenyl)-1-phenylethane, 1,4-bis[2-(4-hydroxyphenyl)-2-propyl]benzene (bisphenol P), 1,3-bis[2-(4-hydroxyphenyl)-2-propyl]benzene (bisphenol M), 4,4'-dihydroxydiphenyl (DOD), 4,4'-dihydroxybenzophenone, bis(2-hydroxynaphth-1-yl)methane, bis(4-hydroxynaphth-1-yl)methane, 1,5-dihydroxynaphthalene, tris(4-hydroxyphenyl)methane, 1,1,2,2-tetrakis(4-hydroxyphenyl)ethane, bis(4-hydroxyphenyl) ether or bis(4-hydroxyphenyl) sulfone;

novolaks, which are especially condensation products of phenol or cresols with formaldehyde or paraformaldehyde or acetaldehyde or crotonaldehyde or isobutyraldehyde or 2-ethylhexanal or benzaldehyde or furfural;

aromatic amines such as aniline, toluidine, 4-aminophenol, 4,4'-methylenediphenyldiamine, 4,4'-methylenediphenyldi(N-methyl)amine, 4,4'-[1,4-phenylenebis(1-methylethylidene)]bisaniline (bisaniline P) or 4,4'-[1,3-phenylenebis(1-methylethylidene)]bisaniline (bisaniline M).

Further suitable epoxy resins are aliphatic or cycloaliphatic polyepoxides, especially glycidyl ethers of saturated or unsaturated, branched or unbranched, cyclic or open-chain di-, tri- or tetrafunctional $C_2$ to $C_{30}$ alcohols, especially ethylene glycol, propylene glycol, butylene glycol, hexanediol, octanediol, polypropylene glycols, dimethylolcyclohexane, neopentyl glycol, dibromoneopentyl glycol, castor oil, trimethylolpropane, trimethylolethane, pentaerythritol, sorbitol or glycerol, or alkoxylated glycerol or alkoxylated trimethylolpropane;

a hydrogenated bisphenol A, F or A/F liquid resin or the glycidylation products of hydrogenated bisphenol A, F or A/F;

an N-glycidyl derivative of amides or heterocyclic nitrogen bases, such as triglycidyl cyanurate or triglycidyl isocyanurate, or reaction products of epichlorohydrin with hydantoin.

The epoxy resin is preferably a liquid resin or a mixture comprising two or more liquid epoxy resins.

"Liquid epoxy resin" refers to an industrial polyepoxide having a glass transition temperature below 25° C.

The resin component optionally additionally contains proportions of solid epoxy resin.

The epoxy resin is especially a liquid resin based on a bisphenol, especially a bisphenol A diglycidyl ether and/or bisphenol F diglycidyl ether, as are commercially available for example from Olin, Huntsman or Momentive. These liquid resins have a low viscosity for epoxy resins and permit rapid curing and high hardnesses. They may comprise proportions of solid bisphenol A resin or novolak glycidyl ethers.

The resin component may comprise a reactive diluent.

Preferred reactive diluents are reactive diluents containing epoxy groups, especially butanediol diglycidyl ether, hexanediol diglycidyl ether, trimethylolpropane di- or triglycidyl ether, phenyl glycidyl ether, cresyl glycidyl ether, guaiacol glycidyl ether, 4-methoxyphenyl glycidyl ether, p-n-butylphenyl glycidyl ether, p-tert-butylphenyl glycidyl ether, 4-nonylphenyl glycidyl ether, 4-dodecylphenyl glycidyl ether, cardanol glycidyl ether, benzyl glycidyl ether, allyl glycidyl ether, butyl glycidyl ether, hexyl glycidyl ether, 2-ethylhexyl glycidyl ether, or glycidyl ethers of natural alcohols, such as in particular $C_8$ to $C_{10}$ or $C_{12}$ to $C_{14}$ or $C_{13}$ to $C_{15}$ alkyl glycidyl ethers.

The epoxy resin composition preferably comprises at least one further constituent selected from the group consisting of thinners, accelerators and fillers.

Suitable accelerators are those already mentioned, especially salicylic acid, calcium nitrate or 2,4,6-tris(dimethylaminomethyl)phenol or a combination thereof.

Suitable thinners are those already mentioned, especially those having a boiling point of more than 200° C.

The thinner is preferably selected from the group consisting of benzyl alcohol, styrenized phenol, ethoxylated phenol, aromatic hydrocarbon resins containing phenol groups, especially the Novares® LS 500, LX 200, LA 300 or LA 700 products (from Rutgers), diisopropylnaphthalene and cardanol.

Particular preference is given to benzyl alcohol.

Suitable fillers are, in particular, ground or precipitated calcium carbonate, which is optionally coated with fatty acid, especially stearates, baryte (heavy spar), talc, quartz powder, quartz sand, silicon carbide, iron mica, dolomite, wollastonite, kaolin, mica (potassium aluminum silicate), molecular sieve, aluminum oxide, aluminum hydroxide, magnesium hydroxide, silica, cement, gypsum, fly ash, carbon black, graphite, metal powders such as aluminum, copper, iron, zinc, silver or steel, PVC powder or hollow beads.

Preference is given to calcium carbonate, quartz flour, quartz sand or a combination thereof.

The epoxy resin composition may optionally comprise further auxiliaries and additives, especially the following:
  reactive diluents, especially those already mentioned, or epoxidized soybean oil or linseed oil, compounds containing acetoacetate groups, especially acetoacetylated polyols, butyrolactone, carbonates, aldehydes, isocyanates or silicones having reactive groups;
  polymers, especially polyamides, polysulfides, polyvinyl formal (PVF), polyvinyl butyral (PVB), polyurethanes (PUR), polymers having carboxyl groups, polyamides, butadiene-acrylonitrile copolymers, styrene-acrylonitrile copolymers, butadiene-styrene copolymers, homo- or copolymers of unsaturated monomers, especially from the group comprising ethylene, propylene, butylene, isobutylene, isoprene, vinyl acetate or alkyl (meth)acrylates, especially chlorosulfonated polyethylenes or fluorine-containing polymers or sulfonamide-modified melamines;
  fibers, especially glass fibers, carbon fibers, metal fibers, ceramic fibers or polymer fibers such as polyamide fibers or polyethylene fibers;
  pigments, especially titanium dioxide, iron oxides or chromium(III) oxide;
  rheology modifiers, especially thickeners or antisettling agents;
  adhesion improvers, especially organoalkoxysilanes;
  flame-retardant substances, especially the aluminum hydroxide or magnesium hydroxide fillers already mentioned, antimony trioxide, antimony pentoxide, boric acid $(B(OH)_3)$, zinc borate, zinc phosphate, melamine borate, melamine cyanurate, ammonium polyphosphate, melamine phosphate, melamine pyrophosphate, polybrominated diphenyl oxides or diphenyl ethers, phosphates such as in particular diphenyl cresyl phosphate, resorcinol bis(diphenyl phosphate), resorcinol diphosphate oligomer, tetraphenylresorcinol diphosphite, ethylenediamine diphosphate, bisphenol A bis(diphenyl phosphate), tris(chloroethyl) phosphate, tris(chloropropyl) phosphate, tris(dichloroisopropyl) phosphate, tris[3-bromo-2,2-bis(bromomethyl)propyl] phosphate, tetrabromobisphenol A, bis(2,3-dibromopropyl ether) of bisphenol A, brominated epoxy resins, ethylenebis(tetrabromophthalimide), ethylenebis(dibromonorbomanedicarboximide), 1,2-bis(tibromophenoxy)ethane, tris(2,3-dibromopropyl) isocyanurate, tribromophenol, hexabromocyclododecane, bis (hexachlorocyclopentadieno)cyclooctane or chloroparaffins; or
  additives, especially dispersed paraffin wax, film-forming auxiliaries, wetting agents, leveling agents, defoamers, deaerators, stabilizers against oxidation, heat, light or UV radiation, or biocides.

The epoxy resin composition preferably comprises further auxiliaries and additives, especially pigments, wetting agents, leveling agents and/or defoamers.

The epoxy resin composition preferably has only a low content of thinners. It preferably contains less than 20% by weight, more preferably less than 15% by weight, especially less than 10% by weight, of thinners. This permits low-emissions or emissions-free epoxy resin products.

The epoxy resin composition preferably has only a low content of water, preferably less than 5% by weight, in particular less than 1% by weight, of water.

In the epoxy resin composition, the ratio of the number of groups reactive toward epoxy groups relative to the number of epoxy groups is preferably within a range from 0.5 to 1.5, in particular 0.7 to 1.2.

The primary and secondary amino groups present in the epoxy resin composition, and any further groups present that are reactive toward epoxy groups, react with the epoxy groups, resulting in ring opening (addition reaction) thereof. As a result primarily of this reaction, the composition polymerizes and thereby cures.

The resin component and the curing agent component of the epoxy resin composition are stored in separate containers. Further constituents of the epoxy resin composition may be present as a constituent of the resin component or of the curing agent component; further constituents reactive toward epoxy groups are preferably a constituent of the curing agent component. It is likewise possible for further constituents to be present as a dedicated, separate component.

A suitable container for storage of the resin component or the curing agent component is especially a vat, a hobbock, a bag, a bucket, a can, a cartridge or a tube. The components are storable, meaning that they can be stored prior to use for several months up to one year or longer without any change in their respective properties to a degree relevant to their use. For the use of the epoxy resin composition, the components are mixed with one another shortly before or during application. The mixing ratio between the resin component and the curing agent component is preferably chosen such that the groups of the curing agent component that are reactive toward epoxy groups are in a suitable ratio to the epoxy groups of the resin component, as described above. In parts by weight, the mixing ratio between the resin component and the curing agent component is normally within a range from 1:10 to 10:1.

The components are mixed by means of a suitable method; this mixing may be done continuously or batchwise. If the mixing does not immediately precede the application, it must be ensured that not too much time passes between mixing the components and the application thereof and that application takes place within the pot life. Mixing takes place in particular at ambient temperature, which is typically within a range from about 5 to 40° C., preferably about 10 to 35° C.

Curing by chemical reaction begins with the mixing of the two components, as described above. Curing typically takes place at a temperature within a range from 0 to 150° C. It preferably takes place at ambient temperature and typically extends over a period of a few days to weeks. The duration depends on factors including the temperature, the reactivity of the constituents, and the stoichiometry thereof, and on the presence of accelerators.

When freshly mixed, the epoxy resin composition has low viscosity. The viscosity at 20° C. 10 minutes after the resin component and curing agent component have been mixed is preferably within a range from 300 to 4000 mPas, preferably 300 to 3000 mPas, in particular 300 to 2500 mPa·s, measured using a cone-plate viscometer at a shear rate of 10 s$^{-1}$.

The epoxy resin composition is applied to at least one substrate, the following substrates being particularly suitable:
- glass, glass ceramic, concrete, mortar, cement screed, fiber cement, brick, tile, plaster or natural rocks such as granite or marble;
- repair or leveling compounds based on PCC (polymer-modified cement mortar) or ECC (epoxy resin-modified cement mortar);
- metals or alloys such as aluminum, iron, steel, copper, other nonferrous metals, including surface-upgraded metals or alloys such as galvanized or chrome-plated metals;
- asphalt or bitumen;
- leather, textiles, paper, wood, woodbase materials bonded with resins, e.g. phenolic, melamine or epoxy resins, resin-textile composites or further so-called polymer composites;
- plastics, such as rigid and flexible PVC, polycarbonate, polystyrene, polyester, polyamide, PMMA, ABS, SAN, epoxy resins, phenolic resins, PUR, POM, TPO, PE, PP, EPM or EPDM, in each case untreated or surface-treated, for example by means of plasma, corona or flames;
- fiber-reinforced plastics, such as carbon fiber-reinforced plastics (CFRP), glass fiber-reinforced plastics (GFRP) and sheet molding compounds (SMC);
- insulation foams, especially made of EPS, XPS, PUR, PIR, rock wool, glass wool or foamed glass;
- coated or painted substrates, especially painted tiles, coated concrete, powder-coated metals or alloys or painted metal sheets;
- coatings, paints or varnishes, especially coated floors that have been overcoated with a further floor covering layer.

If required, the substrates can be pretreated prior to application, especially by physical and/or chemical cleaning methods or the application of an activator or a primer.

The curing of the epoxy resin composition affords a cured composition.

Once cured, the epoxy resin composition has in particular a high glass transition temperature, especially when it also comprises, in the curing agent, IPDA in addition to the adduct of the invention.

After a curing time of 14 days at room temperature, the glass transition temperature is during the first heating (first run) preferably at least 47° C., preferably at least 49° C., and in the second heating (second run) at least 60° C., preferably at least 63° C., determined by DSC with a measurement program of (1) −10° C. for 2 min, (2) −10 to 200° C. at a heating rate of 10 K/min (=first run), (3) 200 to −10° C. at a cooling rate of −50 K/min, (4) −10° C. for 2 min, (5) −10 to 180° C. at a heating rate of 10 K/min (=second run).

The epoxy resin composition is preferably used as coating, primer, adhesive, sealant, potting compound, casting resin, impregnating resin or as matrix for fiber composites such as CFRP or GFRP in particular.

The epoxy resin composition is particularly preferably used as a coating. Coatings are understood here to mean coverings of all kinds that are applied over an area, especially floor coverings, paints, varnishes, sealants, basecoats, primers or protective coatings, especially also those for heavy-duty corrosion protection. The epoxy resin composition is particularly suitable as a floor covering or floor coating for interiors such as offices, industrial halls, sports halls or cold rooms, or outdoors for balconies, terraces, parking decks, bridges or roofs, as a protective coating for concrete, cement, metals, plastics or wood, for example for surface sealing of wood constructions, vehicles, loading areas, tanks, silos, shafts, pipelines, machines or steel constructions, for example of ships, piers, offshore platforms, lock gates, hydroelectric power plants, river constructions, swimming pools, wind turbines, bridges, chimneys, cranes or sheet-pile walls, or as an undercoat, tiecoat or anticorrosion primer or for hydrophobization of surfaces.

The epoxy resin composition is particularly advantageously used in low-emission coatings with environmental quality seals, for example in accordance with (EC1 Plus), AgBB, DIBt, Der Blaue Engel, AFSSET, RTS (M1) and US Green Building Council (LEED).

For use as a coating, the epoxy resin composition advantageously has a fluid consistency with low viscosity and good leveling properties. The mixed composition is typically applied, within its pot life, to the surface of a substrate as a thin film having a layer thickness of about 50 μm to about 5 mm, typically at ambient temperature. It is applied especially by pouring onto the substrate to be coated and then spreading it evenly using, for example, a doctor blade or a notched trowel. It may also be applied with a brush or roller or in the form of a spray application, for example as an anticorrosion coating on steel. Curing typically gives rise to substantially homogeneous, glossy and nontacky films of high hardness that have good adhesion to a wide variety of different substrates.

In this case, the epoxy resin composition is used in particular in a method for coating, comprising the steps of
(i) mixing the components of the epoxy resin composition,
(ii) applying the mixed composition to a substrate within the pot life, followed by the curing of the mixed composition.

It is possible to apply a further coating to the fully or partly cured composition, in which case said further layer may likewise be an epoxy resin composition, or else another material, especially a polyurethane or polyurea coating.

Particular preference is also given to using the epoxy resin composition as an adhesive. When used as adhesive, the epoxy resin composition typically has, after the components have been mixed, a pasty consistency with structurally viscous properties. On application, the mixed adhesive is applied within the pot life to at least one of the substrates to be bonded and the two substrates are joined to form an adhesive bond within the open time of the adhesive.

The mixed adhesive is applied especially by means of a brush, roll, spatula, doctor blade or trowel, or from a tube, cartridge or metering device.

The adhesive is particularly suitable for uses in the construction industry, especially for the reinforcement of built structures by means of steel lamellas or lamellas made of carbon fiber-reinforced composite plastics (CFRP), for constructions containing bonded precast concrete components, especially bridges or concrete towers, for example for wind turbines, shafts, pipelines or tunnels, or for constructions containing bonded natural rocks, ceramic elements or parts made of fiber cement, steel, cast iron, aluminum, wood or polyester, for the anchoring of dowels or steel bars in boreholes, for the fixing of, for example, handrails, balustrades or door frames, for repairs such as in particular the filling of edges, holes or joins in concrete maintenance, or for the bonding of films of polyvinyl chloride (PVC), flexibilized polyolefin (Combiflex®) or adhesion-modified chlorosulfonated polyethylene (Hypalon®) to concrete or steel.

Further fields of use relate to structural bonding in the construction or manufacturing industry, especially as adhesive mortar, assembly adhesive, reinforcement adhesive such as, in particular, for the bonding of lamellas made of CFRP or steel to concrete, brickwork or wood, as element adhesive, for example for bridge elements, sandwich element adhesive, facade element adhesive, reinforcing adhesive, bodywork adhesive or half-shell adhesive for rotor blades of wind turbines.

Such an epoxy resin adhesive is likewise suitable for filling cavities such as gaps, cracks or drill holes, wherein the adhesive is filled or injected into the cavity and fills it after curing, and bonds or sticks the flanks of the cavity to one another in a force-fitting manner.

In this case, the epoxy resin composition is used in particular in a method for bonding, comprising the steps of
(i) mixing the components of the epoxy resin composition,
(ii) applying the mixed composition within the pot life, either to at least one of the substrates to be bonded and joining the substrates to form a bond within the open time,
or into a cavity or gap between two or more substrates and optionally
inserting an anchor into the cavity or gap within the open time, followed by the curing of the mixed composition.

An "anchor" refers here more particularly to a rebar, a threaded rod or a bolt. An anchor is in particular thus adhesive-bonded or anchored in a wall, ceiling or foundation in such a way that a portion thereof is bonded in a force-fitting manner and a portion thereof protrudes and can be subjected to a construction load.

Identical or different substrates may be bonded.

The application and curing of the epoxy resin composition afford an article.

The invention thus further provides an article obtained from the use of the epoxy resin composition.

The article is preferably a built structure or part thereof, especially a built structure above or below ground, an office, an industrial hall, a sports hall, a cold room, a silo, a bridge, a roof, a staircase, a floor, a balcony, a terrace or a parking deck, or an industrial good or a consumer good, especially a pier, an offshore platform, a lock gate, a crane, a bulkhead, a pipeline or a rotor blade of a wind turbine, or a mode of transport such as in particular an automobile, a truck, a rail vehicle, a ship, an aircraft or a helicopter, or an installable component thereof.

The epoxy resin composition is characterized by advantageous properties. It can also be formulated with little or no thinner, such formulations having low viscosity and good processability and curing reliably and quickly, in particular even under damp and cold conditions. This results in coatings of high mechanical quality and having high surface quality. Such epoxy resin products are particularly suitable as coatings, especially for floors. The amine-functional adduct present in the epoxy resin composition permits high flexibility for combining with further amines and thinners and permits particularly rapid curing. Optional IPDA additionally present permits an increased glass transition temperature.

EXAMPLES

Working examples are adduced hereinafter, which are intended to further elucidate the invention described. The invention is of course not limited to these described working examples.

"AHEW" stands for amine hydrogen equivalent weight.
"EEW" stands for epoxy equivalent weight.
"Standard climatic conditions" ("SCC") refers to a temperature of 23±1° C. and a relative air humidity of 50±5%.

The chemicals used were unless otherwise stated from Sigma-Aldrich Chemie GmbH.

Description of the Measurement Methods:

The viscosity was measured on a thermostated Rheotec RC30 cone-plate viscometer (cone diameter 50 mm, cone angle 1°, cone tip-plate distance 0.05 mm, shear rate 10 s$^1$).

The amine value was determined by titration (with 0.1N HClO$_4$ in acetic acid against crystal violet).

Liquid chromatography (UHPLC) was carried out for quantitative determination of N-benzylethane-1,2-diamine after derivatization with phenyl isocyanate against external calibration.

Gel-permeation chromatography (GPC) was carried out for determination of the weight ratios between 2:1 adduct, 3:2 adduct and >3:2 adduct against polystyrene as a standard.

Substances and Abbreviations Used:
Araldite® GY 250: Bisphenol A diglycidyl ether, EEW 187 g/equiv. (from Huntsman)
Araldite® DY-E: Monoglycidyl ethers of $C_{12}$ to $C_{14}$ alcohols, EEW approx. 290 g/equiv. (from Huntsman)
B-EDA N-Benzylethane-1,2-diamine, prepared as described below, 150.2 g/mol, AHEW 50 g/equiv.
IPDA 3-Aminomethyl-3,5,5-trimethylcyclohexylamine, AHEW 42.6 g/equiv. (Vestamin® IPD from Evonik)
Ancamine® K54 2,4,6-Tris(dimethylaminomethyl)phenol (from Air Products)

Preparation of Diamines of Formula (I):
N-Benzylethane1,2-Diamine (B-EDA):

A round-bottomed flask was charged with 180.3 g (3 mol) of ethane-1,2-diamine under a nitrogen atmosphere at room temperature. A solution of 106.0 g (1 mol) of benzaldehyde in 1200 ml of isopropanol was slowly added dropwise while stirring well and stirring was continued for a further 2 hours. The reaction mixture was then hydrogenated in a continuous hydrogenation apparatus with a Pd/C fixed-bed catalyst at a hydrogen pressure of 80 bar, a temperature of 80° C., and a flow rate of 5 ml/min. To monitor the reaction, IR spectroscopy was used to check whether the imine band at approx. 1665 cm$^{-1}$ had disappeared. The hydrogenated solution was then concentrated on a rotary evaporator at 65° C., removing unreacted ethane-1,2-diamine, water, and isopropanol. The reaction mixture thus obtained was a clear, pale yellowish liquid having an amine value of 678 mg KOH/g and containing approx. 85% by weight of N-benzylethane-1,2-diamine (retention time 8.47-8.57 min), as determined by GC.

120 g of this reaction mixture was purified by distillation at 80° C. under reduced pressure, resulting in 75.1 g of distillate (N-benzylethane-1,2-diamine) being collected at a vapor temperature of 60 to 65° C. and 0.06 mbar. A colorless liquid having a viscosity of 8 mPa·s at 20° C., an amine value of 750 mg KOH/g and a purity, determined by GC, of >97% was obtained, which was used in the examples below. This was used for the further examples.

Preparation of Adducts:
Adduct A1: (Inventive Adduct Containing 1.5 Moles of Diamine (1) to 1 Molar Equivalent of Epoxy Groups)

An initial charge of 45.0 g (0.3 mol) of N-benzylethane-1,2-diamine (B-EDA) was heated to 80° C. under a nitrogen atmosphere. To this was slowly added 36.8 g (0.2 mol of epoxy groups) of Araldite® GY 250 while stirring well, with the temperature of the reaction mixture maintained between 70 and 90° C. by cooling. The reaction mixture was held within this temperature range for one hour and then cooled. A clear, slightly yellowish liquid having a viscosity at 20° C. of 262 Pa·s (at 25° C. of 132 Pa·s), an amine value of 408 mg KOH/g, and a calculated AHEW of 116.3 g/equiv. was obtained.

After storage for 3 months at room temperature in a sealed vessel, the adduct remained clear and liquid.

The adduct A1 contained 24.2% by weight of N-benzylethane-1,2-diamine according to UHPLC, the adduct molecules being in the weight ratio 2:1 adducts/3:2 adducts/>3:2 adducts=42.5/27.0/30.5 according to GPC.

Adduct A2: (Comparative Example Containing 2.5 Moles of Diamine (1) to 1 Molar Equivalent of Epoxy Groups)

An initial charge of 45.0 g (0.3 mol) of N-benzylethane-1,2-diamine (B-EDA) was heated to 80° C. under a nitrogen atmosphere. To this was slowly added 22.5 g (0.12 mol of epoxy groups) of Araldite® GY 250 while stirring well, with the temperature of the reaction mixture maintained between 70 and 90° C. by cooling. The reaction mixture was held within this temperature range for one hour and then cooled. A clear, slightly yellowish liquid having a viscosity at 20° C. of 2.8 Pa·s, an amine value of 493 mg KOH/g, and a calculated AHEW of 86.5 g/equiv. was obtained.

The adduct A2 contained 45.1% by weight of N-benzylethane-1,2-diamine according to UHPLC, the adduct molecules being in the weight ratio 2:1 adducts/3:2 adducts/>3:2 adducts=63/27/10 according to GPC.

Adduct A3: (Adduct of IPDA)

An initial charge of 51.1 g (0.3 mol) of IPDA and 147.3 g benzyl alcohol was heated to 80° C. under a nitrogen atmosphere. To this was slowly added 37.6 g (0.2 mol of epoxy groups) of Araldite® GY 250 while stirring well, with the temperature of the reaction mixture maintained between 70 and 90° C. by cooling. The reaction mixture was held within this temperature range for one hour and then cooled. A clear, slightly yellowish liquid having a calculated AHEW of 236.4 g/equiv. was obtained.

Preparation of Curing Agents and Epoxy Resin Compositions:

Examples 1 to 9

For each example, the ingredients of the resin component specified in Tables 1 and 2 were mixed in the specified amounts (in parts by weight) using a centrifugal mixer (SpeedMixer™ DAC 150, FlackTek Inc.) and stored with the exclusion of moisture.

The ingredients of the curing agent component specified in Tables 1 and 2 were likewise processed and stored.

The two components of each composition were then processed using the centrifugal mixer into a homogeneous liquid and this was tested immediately as follows:

10 minutes after mixing, the viscosity was measured at 20° C. ("Viscosity (10')").

The gel time was determined in standard climatic conditions by agitating the mixed composition (25 g) with a spatula from time to time until it began to gel.

For determination of Shore D hardness in accordance with DIN 53505, two cylindrical test specimens (diameter 20 mm, thickness 5 mm) were in each case produced. One was stored under standard climatic conditions and the hardness measured after 1 day and after 2 days (1 d SCC and 2 d SCC); the other was stored at 8° C. and 80% relative humidity and the hardness measured after 1 day and after 2 days in the cold state (1 d 8°/80% and 2 d 8°/80%).

A first film coating was applied to a glass plate in a layer thickness of 500 µm, and this was stored/cured under standard climatic conditions. The König hardness (König pendulum hardness, measured in accordance with DIN EN ISO 1522) was determined on this film after 1 day ("König hardness (1 d SCC)"), after 2 days ("König hardness (2 d SCC)"), after 4 days ("König hardness (4 d SCC)"), after 7 days ("König hardness (7 d SCC)"), and after 14 days ("König hardness (14 d SCC)"). Once values of more than 200 s had been attained, the König hardness was not determined again. After 14 days, the appearance of the film was assessed (designated "Appearance (SCC)" in the table). A film was described as "nice" if it had a glossy and nontacky surface with no structure. "Structure" refers to any kind of marking or pattern on the surface.

A second film coating was applied to a glass plate in a layer thickness of 500 µm and this was immediately after application stored/cured for 7 days at 8° C. and 80% relative humidity and then for 2 weeks under standard climatic conditions. 24 hours after application, a polypropylene bottle top beneath which a small damp sponge had been positioned was placed on the film. After a further 24 hours, the sponge and the bottle top were removed and positioned at a new point on the film, from which they were in turn removed and repositioned after 24 hours, this being done a total of 4 times. The appearance of this film was then assessed (designated "Appearance (8°/80%)" in the tables) in the same way as described for Appearance (SCC). Also reported in each case here was the number and nature of visible marks that had formed in the film as a result of the damp sponge or the bottle top on top. The number of white-colored spots was reported as "blushing". A faint white discolored spot was designated as "(1)". The designation "ring" was reported if a ring-shaped imprint was present due to sinking of the first bottle top applied 24 hours after application. Such a ring-shaped impression indicates that the coating was not ready to be walked on. The König hardness was again determined on the films thus cured, in each case after 7 days at 8° C. and 80% relative humidity ("König hardness (7 d 8°/80%)") and then after a further 2 days under SCC ("König hardness (+2 d SCC)"), 7 days under SCC ("König hardness (+7 d SCC)"), and 14 d under SCC ("König hardness (+14 d SCC)"). Once values of more than 190 s had been attained, the König hardness was not determined again. The Tg (glass transition temperature) was determined by DSC on cured samples that had been stored under standard climatic conditions for 14 days using a Mettler Toledo DSC 3+ 700 instrument and the following measurement program: (1) −10° C. for 2 min. (2) −10 to 200° C. at a heating rate of 10 K/min (=1st run), (3) 200 to −10° C. at a cooling rate of −50 K/min, (4) −10° C. for 2 min, (5) −10 to 180° C. at a heating rate of 10 K/min (=2nd run).

As a measure of yellowing, the change in color after stressing in a weathering tester was determined. For this, a further film coating was applied to a glass plate in a layer thickness of 500 µm and this was stored/cured under standard climatic conditions for 2 weeks and then stressed for 72 hours at a temperature of 65° C. in a model Q-Sun Xenon Xe-1 weathering tester having a Q-SUN Daylight-Q optical filter and a xenon lamp having a light intensity of 0.51 W/m$^2$ at 340 nm (Q-Sun (72 h)). The difference in color ΔE of the stressed film versus the corresponding unstressed film was then determined using an NH310 colorimeter from Shenzen 3NH Technology Co. LTD equipped with silicon photoelectric diode detector, light source A, color space measurement interface CIE L*a*b*C*H*. ΔE values up to 5 represent slight yellowing.

The results are reported in Tables 1 and 2.

The examples designated "(Ref.)" are comparative examples.

TABLE 1

Composition and properties of examples 1 to 5

| | Example | | | | |
|---|---|---|---|---|---|
| | 1 | 2 | 3 (Ref.) | 4 | 5 (Ref.) |
| Resin comp.: | | | | | |
| Araldite ® GY 250: | 167.2 | 167.2 | 167.2 | 167.2 | 167.2 |
| Araldite ® DY-E: | 31.8 | 31.8 | 31.8 | 31.8 | 31.8 |
| Curing agent comp.: | | | | | |
| Adduct A1 | 116.3 | 64.0 | — | 45.2 | — |
| Adduct A2 | — | — | 86.5 | — | 61.0 |
| B-EDA | — | 22.5 | — | 15.8 | — |
| IPDA | — | — | — | 12.8 | 12.8 |
| Benzyl alcohol | — | — | — | 20.0 | 20.0 |
| Viscosity (10') [Pa · s] | 13.3 | 2.20 | 2.09 | 1.19 | 1.15 |
| Gel time (h:min) | 2:50 | 3:25 | 3:40 | 3:30 | 3:45 |
| Shore D (1 d SCC) | 78 | 78 | 77 | 69 | 69 |
| (2 d SCC) | 78 | 78 | 78 | 72 | 73 |
| Shore D (1 d 8°/80%) | 73 | 64 | 59 | 37 | 31 |
| (2 d 8°/80%) | 79 | 77 | 76 | 71 | 72 |
| König h. (1 d SCC) | 182 | 165 | 157 | 42 | 36 |
| [s] (2 d SCC) | 207 | 195 | 192 | 84 | 82 |
| (4 d SCC) | | 206 | 206 | 115 | 116 |
| (7 d SCC) | | | | 137 | 137 |
| (14 d SCC) | | | | 154 | 153 |
| Appearance (SCC) | nice | nice | nice | nice | nice |
| Q-Sun (72 h) ΔE | 3.1 | 3.6 | 3.6 | 3.1 | 3.7 |
| König h. (7 d 8°/80%) | 97 | 98 | 87 | 34 | 32 |
| [s] (+2 d SCC) | 195 | 179 | 179 | 99 | 95 |
| (+7 d SCC) | | 196 | 193 | 133 | 125 |
| (+14 d SCC) | | | | 148 | 132 |
| Appearance (8°/80%) | nice | nice | nice | nice | nice |
| Blushing | (1) | (1) | (1) | (1) | (1) |
| Ring | none | none | none | none | none |

TABLE 2

Composition and properties of examples 4 and 6 to 9.

| | Example | | | | |
|---|---|---|---|---|---|
| | 6 | 4 | 7 | 8 | 9 |
| Resin comp.: | | | | | |
| Araldite ® GY 250: | 167.2 | 167.2 | 167.2 | 167.2 | 167.2 |
| Araldite ® DY-E: | 31.8 | 31.8 | 31.8 | 31.8 | 31.8 |
| Curing agent comp.: | | | | | |
| Adduct A1 | 45.2 | 45.2 | 45.2 | 58.2 | 23.3 |
| B-EDA | 30.6 | 15.8 | 8.0 | — | 15.0 |
| Adduct A3 | — | — | — | — | 47.3 |
| IPDA | — | 12.8 | 19.2 | 21.3 | 12.8 |
| Benzyl alcohol | 20.0 | 20.0 | 20.0 | 20.0 | — |
| Ancamine ® K54 | — | — | — | — | 4.0 |
| Viscosity (10') [Pa · s] | 0.99 | 1.19 | 1.44 | 2.41 | 1.22 |
| Gel time (h:min) | 3:50 | 3:30 | 3:30 | 3:15 | 3:15 |
| Shore D (1 d SCC) | 68 | 69 | 69 | 79 | 69 |
| (2 d SCC) | 73 | 72 | 74 | 73 | 74 |
| Shore D (1 d 8°/80%) | 37 | 37 | 34 | 41 | 38 |
| (2 d 8°/80%) | 72 | 71 | 71 | 73 | 73 |

TABLE 2-continued

Composition and properties of examples 4 and 6 to 9.

| | | Example | | | | |
|---|---|---|---|---|---|---|
| | | 6 | 4 | 7 | 8 | 9 |
| König h. | (1 d SCC) | 48 | 42 | 43 | 57 | 66 |
| [s] | (2 d SCC) | 85 | 84 | 103 | 104 | 116 |
| | (7 d SCC) | 113 | 137 | 151 | 164 | 154 |
| | (14 d SCC) | 113 | 154 | 165 | 174 | 168 |
| Appearance (SCC) | | nice | nice | nice | nice | nice |
| Tg 1st/2nd run [° C.] | | 43/52 | 49/64 | 55/72 | 53/75 | 52/73 |
| Q-Sun (72 h) ΔE | | 3.9 | 3.1 | 3.3 | 2.9 | 17.0 |
| König h. | (7 d 8°/80%) | 18 | 34 | 42 | 48 | 42 |
| [s] | (+2 d SCC) | 55 | 99 | 126 | 132 | 132 |
| | (+7 d SCC) | 76 | 133 | 146 | 155 | 164 |
| | (+14 d SCC) | 95 | 148 | 164 | 168 | 166 |
| Appearance | (8°/80%) | nice | nice | nice | nice | nice |
| Blushing | | (1) | (1) | (1) | (1) | 0 |
| Ring | | none | none | none | none | none |

The invention claimed is:

1. An amine-functional adduct from the reaction of
   (i) at least one diamine that is N-benzylethane-1,2-diamine, with
   (ii) at least one aromatic diepoxide, the at least one aromatic diepoxide having an epoxide equivalent weight of from 156 to 200 g/equiv, in a stoichiometric ratio within a range from 1.3 to 1.7 moles of diamine to 1 molar equivalent of epoxy groups,
   wherein the adduct includes 2:1 adducts derived from 2 moles of N-benzylethane-1,2-diamine and 1 mole of the aromatic diepoxide, and higher adducts selected from the group consisting of one or more of 3:2 adducts derived from 3 moles of N-benzylethane-1,2-diamine and 2 moles of the aromatic diepoxide, 4:3 adducts derived from 4 moles of N-benzylethane-1,2-diamine and 3 moles of the aromatic diepoxide, and 5:4 adducts derived from 5 moles of N-benzylethane-1,2-diamine and 4 moles of the aromatic diepoxide, wherein a weight ratio of the 2:1 adducts to the higher adducts is within a range from 30/70 to 49.9/50.1, and
   wherein the adduct has a viscosity at 20° C. within a range from 50 to 500 Pa·s, measured using a cone-plate viscometer at a shear rate of 10 s$^{-1}$.

2. The adduct as claimed in claim 1, wherein the N-benzylethane-1,2-diamine has a purity of at least 80% by weight.

3. The adduct as claimed in claim 1, wherein the adduct contains less than 1% by weight of thinner or water.

4. A curing agent for epoxy resins comprising the adduct as claimed in claim 1 and at least one further constituent selected from the group consisting of further amines, accelerators, and thinners.

5. The curing agent for epoxy resins as claimed in claim 4, wherein the curing agent comprises 1% to 70% by weight of the adduct.

6. The curing agent for epoxy resins as claimed in claim 4, wherein the curing agent further comprises 1-amino-3-aminomethyl-3,5,5-trimethylcyclohexane, optionally in the form of an amine-functional adduct with an epoxy resin.

7. The curing agent for epoxy resins as claimed in claim 6, wherein a ratio of a number of amine hydrogens derived from 1-amino-3-aminomethyl-3,5,5-trimethylcyclohexane to a number of amine hydrogens derived from N-benzylethane-1,2-diamine is within a range from 90/10 to 20/80.

8. The adduct as claimed in claim 1, wherein the at least one aromatic diepoxide is selected from the group consisting of bisphenol A diglycidyl ether, bisphenol F diglycidyl ether, and a mixture of bisphenol A diglycidyl ether and bisphenol F diglycidyl ether.

9. An epoxy resin composition comprising
   a resin component comprising at least one epoxy resin and
   a curing agent component comprising an adduct from the reaction of
   (i) at least one diamine that is N-benzylethane-1,2-diamine, with
   (ii) at least one aromatic diepoxide, the at least one aromatic diepoxide having an epoxide equivalent weight of from 156 to 200 g/equiv, in a stoichiometric ratio within a range from 1.3 to 1.7 moles of diamine to 1 molar equivalent of epoxy groups,
   wherein the adduct includes 2:1 adducts derived from 2 moles of N-benzylethane-1,2-diamine and 1 mole of the aromatic diepoxide, and higher adducts selected from the group consisting of one or more of 3:2 adducts derived from 3 moles of N-benzylethane-1,2-diamine and 2 moles of the aromatic diepoxide, 4:3 adducts derived from 4 moles of N-benzylethane-1,2-diamine and 3 moles of the aromatic diepoxide, and 5:4 adducts derived from 5 moles of N-benzylethane-1,2-diamine and 4 moles of the aromatic diepoxide, wherein a weight ratio of the 2:1 adducts to the higher adducts is within a range from 30/70 to 49.9/50.1, and
   wherein the adduct has a viscosity at 20° C. within a range from 50 to 500 Pa·s, measured using a cone-plate viscometer at a shear rate of 10 s$^{-1}$.

10. The epoxy resin composition as claimed in claim 9, wherein the at least one aromatic diepoxide is selected from the group consisting of bisphenol A diglycidyl ether, bisphenol F diglycidyl ether, and a mixture of bisphenol A diglycidyl ether and bisphenol F diglycidyl ether.

* * * * *